US010572389B2

(12) United States Patent
Bhargava et al.

(10) Patent No.: US 10,572,389 B2
(45) Date of Patent: Feb. 25, 2020

(54) CACHE CONTROL AWARE MEMORY CONTROLLER

(71) Applicant: Advanced Micro Devices, Inc., Sunnyvale, CA (US)

(72) Inventors: Ravindra N. Bhargava, Austin, TX (US); Ganesh Balakrishnan, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 15/839,700

(22) Filed: Dec. 12, 2017

(65) Prior Publication Data
US 2019/0179760 A1  Jun. 13, 2019

(51) Int. Cl.
*G06F 12/0895* (2016.01)
*G06F 12/0897* (2016.01)

(52) U.S. Cl.
CPC ...... *G06F 12/0895* (2013.01); *G06F 12/0897* (2013.01); *G06F 2212/1024* (2013.01); *G06F 2212/608* (2013.01)

(58) Field of Classification Search
CPC .................................. G06F 12/0844–0859
See application file for complete search history.

(56) References Cited

U.S. PATENT DOCUMENTS

| | | | | |
|---|---|---|---|---|
| 6,427,188 B1* | 7/2002 | Lyon | ........... | G06F 12/0864 711/122 |
| 8,341,358 B1* | 12/2012 | Edmondson | ........ | G06F 12/0846 711/122 |
| 2006/0026594 A1* | 2/2006 | Yoshida | ........... | G06F 9/3824 718/100 |
| 2009/0006768 A1* | 1/2009 | Luick | ........... | G06F 12/0802 711/145 |
| 2009/0006777 A1* | 1/2009 | Donley | ........... | G06F 12/0895 711/154 |
| 2012/0136857 A1* | 5/2012 | Donley | ........... | G06F 12/0864 707/733 |
| 2012/0144118 A1* | 6/2012 | Tsien | ........... | G06F 12/0846 711/122 |

(Continued)

OTHER PUBLICATIONS

Min et al. "Phased Tag Cache: An efficient Low Power Cache System." May 2004. IEEE. ISCAS 2004. pp. 805-808. (Year: 2004).*

(Continued)

*Primary Examiner* — Nathan Sadler
(74) *Attorney, Agent, or Firm* — Meyertons Hood Kivlin Kowert and Goetzel PC; Rory D. Rankin

(57) ABSTRACT

Systems, apparatuses, and methods for performing efficient memory accesses for a computing system are disclosed. External system memory is used as a last-level cache and includes one of a variety of types of dynamic random access memory (DRAM). A memory controller generates a tag request and a separate data request based on a same, single received memory request. The sending of the tag request is prioritized over sending the data request. A partial tag comparison is performed during processing of the tag request. If a tag miss is detected for the partial tag comparison, then the data request is cancelled, and the memory request is sent to main memory. If one or more tag hits are detected for the partial tag comparison, then processing of the data request is dependent upon the result of the full tag comparison.

17 Claims, 5 Drawing Sheets

(56) References Cited

U.S. PATENT DOCUMENTS

| | | |
|---|---|---|
| 2012/0151251 A1 | 6/2012 | Donley |
| 2012/0297256 A1 | 11/2012 | Plondke et al. |
| 2013/0132675 A1* | 5/2013 | Sleiman .............. G06F 12/0844 |
| | | 711/122 |
| 2013/0138892 A1 | 5/2013 | Loh et al. |
| 2014/0325153 A1* | 10/2014 | Huang ................ G06F 12/0607 |
| | | 711/122 |
| 2015/0309930 A1* | 10/2015 | Olorode ............. G06F 12/0864 |
| | | 711/118 |
| 2015/0347307 A1 | 12/2015 | Walker |

OTHER PUBLICATIONS

Chen et al. "Low Power Set-Associative Cache with Single-Cycle Partial Tag Comparison." Oct. 2005. IEEE. 6th International Conference on ASIC. pp. 144-147. (Year: 2005).*

Megalingam et al. "Phased Set Associative Cache Design for Reduced Power Consumption." Aug. 2009. 2nd IEEE International Conference on Computer Science and Information Technology. pp. 551-556. (Year: 2009).*

Giovanni De Micheli. Synthesis and Optimization of Digital Circuits. 1994. McGraw-Hill. pp. 458-490. (Year: 1994).*

International Search Report and Written Opinion in International Application No. PCT/US2018/51624, dated Jan. 10, 2019, 12 pages.

\* cited by examiner

CACHE CONTROL AWARE MEMORY CONTROLLER

BACKGROUND

Description of the Related Art

As both semiconductor manufacturing processes advance and on-die geometric dimensions reduce, semiconductor chips provide more functionality and performance. However, design issues still arise with modern techniques in processing and integrated circuit design that may limit potential benefits. One issue is that interconnect delays continue to increase per unit length in successive generations of two-dimensional planar layout chips. Also, high electrical impedance between individual chips increases latency. In addition, signals that traverse off-chip to another die may significantly increase power consumption for these signals (e.g., by 10 to 100 times) due to the increased parasitic capacitance on these longer signal routes. Accordingly, memory access latencies for system memory, such as off-chip dynamic random access memory (DRAM), are appreciable.

Another design issue is that most software applications that access a lot of data are typically memory bound in that computation time is generally determined by memory bandwidth. A memory access latency for an off-chip dynamic random access memory (DRAM) may be hundreds to over a thousand clock cycles, and an increased number of cores in a processor design have accentuated the memory bandwidth problem.

In view of the above, efficient methods and systems for performing efficient memory accesses for a computing system are desired.

BRIEF DESCRIPTION OF THE DRAWINGS

The advantages of the methods and mechanisms described herein may be better understood by referring to the following description in conjunction with the accompanying drawings, in which.

Figure 1:
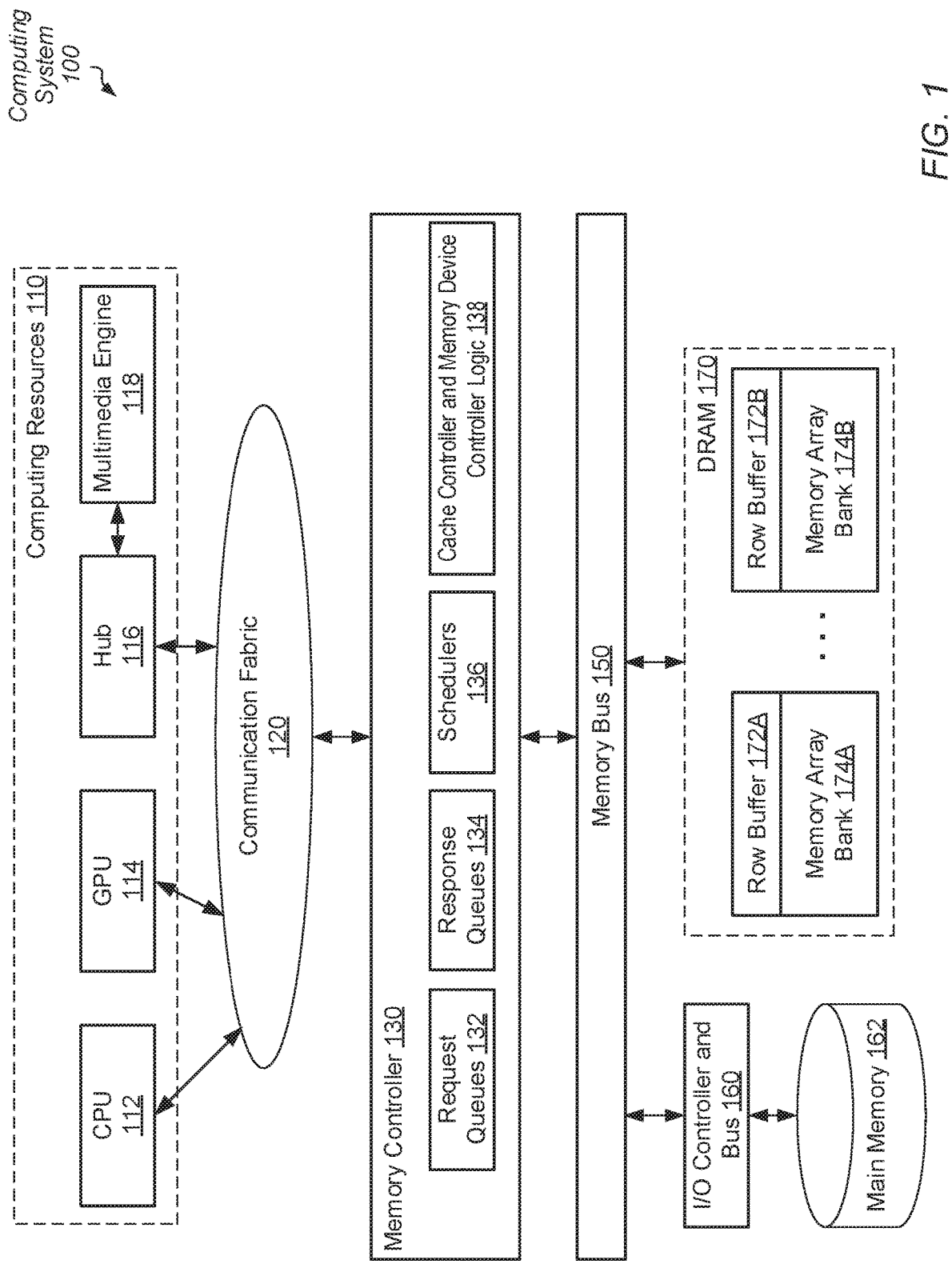
FIG. 1 is a block diagram of one embodiment of a computing system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for performing efficient memory accesses for a computing system are disclosed. In one embodiment, a computing system includes one or more computing resources and external system memory. Examples of the computing resources include a general-purpose central processing unit (CPU), a graphics processing unit (GPU), an accelerated processing unit (APU), and so forth. The computing resources generate memory access requests. In various embodiments, a given computing resource includes a cache memory subsystem. When the given computing resource determines a memory access request misses within the cache memory subsystem, the given computing resource sends the memory access request to a given memory controller.

The given memory controller is coupled to a memory device associated with a target address of the memory access request. If the computing system includes multiple memory devices, then the address spaces are distributed among the multiple memory devices by the operating system. The memory controller supports mapping between the request addresses of the computing resources and addresses pointing to storage locations in the memory device(s). In some embodiments, a memory controller is connected to a single memory device. In other embodiments, a memory controller is connected to multiple memory devices. In various embodiments, the memory controller includes one or more queues for storing memory access requests. In an embodiment, the memory controller includes a read queue for storing memory read requests and a separate write queue for storing memory write requests. In other embodiments, the memory controller includes a unified queue for storing both memory read requests and memory write requests.

In yet other embodiments, the memory controller includes one or more queues for storing received memory access requests and a separate queue for storing scheduled memory access requests selected from the one or more queues. Therefore, the memory controller supports out-of-order issue of the memory access requests to the memory device based on priorities and target addresses. In some embodiments, the memory controller also supports out-of-order issue of the responses to the computing resources based on at least priorities.

The external system memory is implemented in one of a variety of types of dynamic random access memory (DRAM). The DRAM provides at least gigabytes of integrated memory within a microprocessor package. In various embodiments, the relatively large amount of row-based memory storage is used as a last-level cache (LLC) before accessing system memory implemented with more DRAM and/or off-chip disk memory or solid-state memory. In various embodiments, the memory controller coupled to the DRAM divides a received single memory access request into two separate memory access requests. In an embodiment, the memory controller generates a tag access request based on the received memory access request, and generates a data access request different from the tag access request based on the received memory access request.

In some embodiments, the memory controller stores an indication, which specifies each of the tag access request and the data access request is generated from a same received memory access request. In an embodiment, the indication is stored within each of the tag access request and the data access request. In some embodiments, each of the read queue and the write queue is divided into a tag queue and a separate data queue. In one embodiment, the indication is a unique identifier generated from one or more of an identifier generated from a free list, a thread or process identifier, a computing source identifier, a target address, an age or timestamp, and so forth.

In various embodiments, the memory controller prevents sending the data access request until information generated by processing the tag access request is available. Therefore, the tag access request is sent to a memory device before the data access request, if the data access request is sent at all. A given row of multiple rows within the memory device is read. The given row is pointed to by a target address in the tag access request. For example, a page index within the target address is used to identify the given row. In an embodiment, the given row stores one or more tags within a portion of the given row.

The memory controller compares only a portion of the one or more tags stored in the given row with only a portion of a tag in the target address of the tag access request. In various embodiments, the partial tag comparison has an appreciably smaller latency than a full tag comparison. If no matches are detected, then a tag miss occurred, and the memory controller cancels sending the data access request to the memory device. The memory controller invalidates, or otherwise deallocates, a queue entry storing the data access request. Therefore, it is known relatively soon that the requested data is not in the last-level cache implemented in DRAM. For example, it is known after the appreciably smaller latency of the partial tag comparison in contrast to being known after the appreciably larger latency of the full tag comparison.

For a tag miss, the memory controller also sends the single memory access request to off-chip system memory and/or a main memory such a disk memory or a solid-state memory. In an embodiment, the memory controller maintains a copy of the single memory access request in a queue. In other embodiments, the memory controller regenerates the single memory access request from one or more of the tag access request and the separate data access request.

In an embodiment, when the memory controller determines one or more tag hits occurs based on the partial tag comparison, the memory controller compares an entirety of the one or more tags in the given row with an entirety of the tag in the target address of the tag access request. In various embodiments, the full tag comparison has an appreciably larger latency than a partial tag comparison. If the full tag comparison results in a tag miss, then the memory controller performs the above steps used for a tag miss determined from a partial tag comparison. If the full tag comparison results in a tag hit, then the memory controller sends the data access request to the memory device.

The memory controller performs a read or write access of data in the given row based on an access type of the data access request. In an embodiment, the memory controller identifies the data in the given row to access based on a position of a tag corresponding to the tag hit within the given row, which indicates a position of the data within the given row.

Referring to FIG. 1, a generalized block diagram of one embodiment of a computing system 100 is shown. As shown, computing system 100 includes communication fabric 120 between each of memory controller 130 and computing resources 110. In the illustrated embodiment, the computing resources include central processing unit (CPU) 112, graphics processing unit (GPU) 114 and Hub 116. Hub 116 is used for communicating with Multimedia Engine 118. Although a single memory controller 130 is shown, in other embodiments, another number of memory controllers are used in computing system 100. Memory controller 130 receives memory access requests from computing resources 110 via the communication fabric 120 and sends the memory access requests to one or more of off-chip main memory 162 and system memory, which is implemented as dynamic random access memory (DRAM) 170. Memory controller 130 also receives responses from DRAM 170 and main memory 162 and sends the responses to a corresponding source of the request in computing resources 110.

In some embodiments, the components of computing system 100 are individual dies on an integrated circuit (IC), such as a system-on-a-chip (SOC). In other embodiments, the components are individual dies in a system-in-package (SiP) or a multi-chip module (MCM). In one embodiment, computing system 100 is a stand-alone system within a mobile computer, a smart phone, a smartwatch, or a tablet; a desktop; a server; or other. The CPU 112, GPU 114 and Multimedia Engine 118 are examples of computing resources capable of generating memory access requests. Although not shown, in other embodiments, other types of computing resources are included in computing resources 110.

Each of the one or more processor cores in CPU 112 includes circuitry for executing instructions according to a given selected instruction set architecture (ISA). In various embodiments, each of the processor cores in CPU 112 includes a superscalar, multi-threaded microarchitecture used for processing instructions of the given ISA. In an embodiment, GPU 114 includes a high parallel data microarchitecture with a significant number of parallel execution lanes. In one embodiment, the microarchitecture uses single-instruction-multiple-data (SIMD) pipeline for the parallel execution lanes. Multimedia Engine 118 includes processors for processing audio data and visual data for multimedia applications.

In one example, an accelerated processing unit (APU), a display controller, an audio processor, and so forth, are additional candidates to be included in computing resources 110. An example of an APU is a CPU integrated on a same die with a GPU, a FPGA, or other processing unit, thus improving data transfer rates between these units while reducing power consumption. In other embodiments, the APU includes video processing and other application-specific accelerators.

In various embodiments, communication fabric 120 transfers traffic back and forth between computing resources 110 and memory controller 130 and includes interfaces for supporting respective communication protocols. In some embodiments, communication fabric 120 includes at least queues for storing requests and responses, selection logic for arbitrating between received requests before sending requests across an internal network, logic for building and decoding packets, and logic for selecting routes for the packets.

In some embodiments, the address space of the computing system 100 is divided among at least CPU 112, GPU 114 and Hub 116 and one or more other components such as input/ output peripheral devices (not shown) and other types of computing resources. Memory maps are maintained for determining which addresses are mapped to which component, and hence to which one of CPU 112, GPU 114 and Hub 116 a memory request for a particular address should be routed. As software applications access more and more data, the memory subsystem is utilized more heavily. Latencies become more crucial. More on-chip memory storage is used to reduce interconnect latencies. For example, one or more of the computing resources within computing resources 110 include cache memory subsystems to reduce memory latencies for a respective processor core. In various embodiments, the relatively large amount of row-based memory storage in DRAM 170 is used as a last-level cache (LLC) before accessing off-chip system memory (not shown), which can be more DRAM, or main memory 162, which is disk memory or solid-state memory.

In various embodiments, DRAM 170 stores each bit of data in a separate capacitor within an integrated circuit. The capacitor can be either charged or discharged. These two states are used to represent the two logical values of a bit. The DRAM 170 utilizes a single transistor and a capacitor per bit. Compared to six transistors used in on-chip synchronous RAM (SRAM), the DRAM reaches higher densities. Unlike HDDs and flash memory, the DRAM 170 is volatile memory, rather than non-volatile memory. The DRAM 170 loses its data relatively quickly when a power supply is removed.

Recently, progress has been made in three-dimensional integrated circuits (3D ICs) that include two or more layers of active electronic components integrated both vertically and horizontally into a single circuit. The 3D packaging, known as System in Package (SiP) or Chip Stack multi-chip module (MCM), saves space by stacking separate chips in a single package. Components within these layers communicate using on-chip signaling, whether vertically or horizontally. This signaling provides reduced interconnect signal delay over known two-dimensional planar layout circuits.

In an embodiment, DRAM 170 includes a multi-channel memory architecture. This type of architecture increases the transfer speed of data to the memory controller 130 by adding more channels of communication between them. In an embodiment, the multi-channel architecture utilizes multiple memory modules and a motherboard and/or a card capable of supporting multiple channels. In another embodiment, DRAM 170 utilizes three-dimensional integrated circuits (3D ICs) to provide a last-level cache as described earlier. Other memory technologies for the last-level cache that use a row-based access scheme including one or more row buffers or other equivalent structures are possible and contemplated. Examples of other memory technologies include phase-change memories, spin-torque-transfer resistive memories, memristors, and so forth.

As described earlier, in various embodiments, DRAM 170 is used as a last-level cache (LLC) before accessing system memory. In some embodiments, memory controller 130 includes control logic for handling RAM transactions such as DRAM open/activate, precharge, close and refresh commands. Additionally, memory controller 130 includes control logic for handling cache accesses such as tag comparisons and identifying a portion of a larger data read out based on tag comparisons. In various embodiments, DRAM 170 is filled with data from one or more of system memory (not shown) and main memory 162 through the I/O controller and bus 160 and the memory bus 150. A corresponding cache fill line with the requested block is conveyed from the DRAM 170 to a corresponding one of the cache memory subsystems in computing resources 110 in order to complete the original memory access request. The cache fill line is placed in one or more levels of caches.

One example of a protocol for a respective interface to the memory controller 130 is a double data rate (DDR) type of protocol. The protocol determines values used for information transfer, such as a number of data transfers per clock cycle, signal voltage levels, signal timings, signal and clock phases and clock frequencies. Protocol examples include DDR2 SDRAM, DDR3 SDRAM, GDDR4 (Graphics Double Data Rate, version 4) SDRAM, and GDDR5 (Graphics Double Data Rate, version 5) SDRAM. The memory controller 130 includes control circuitry for interfacing to the memory channels and following a corresponding protocol.

As shown, DRAM 170 includes multiple memory array banks 174A-174B. Each one of the banks 174A-174B include a respective one of the row buffers 172A-172B. Each one of the row buffers 172A-172B stores data in an accessed row of the multiple rows within the memory array banks 174A-174B. The accessed row is identified by a DRAM address in the received memory access request. Control logic within logic 138 of DRAM 170 performs complex transactions such as activation (opening) transactions and precharge of data and control lines within DRAM 170 once to access an identified row and once to put back the modified contents stored in the row buffer to the identified row during a close transaction. Each of the different DRAM transactions, such as activation/open, column access, read access, write access, and precharge/close, has a different respective latency. Often, the activation and precharge transactions have significantly higher latencies than the read access and write access transactions.

In various embodiments, DRAM 170 includes one or more memory channels, one or more memory modules or devices per channel, one or more ranks per memory module, one or more banks per rank, and one or more rows per bank. Typically, each row stores a page of data. The size of the page is chosen based on design considerations. The page can be one kilobyte (1 KB), four kilobytes (4 KB), or any size based on design choices.

The cache memory subsystems (not shown) in the computing resources 110 include high-speed cache memories configured to store blocks of data. As used herein, a "block" is a set of bytes stored in contiguous memory locations, which are treated as a unit for coherency purposes. As used herein, each of the terms "cache block", "block", "cache line", and "line" is interchangeable. In some embodiments, a block may also be the unit of allocation and deallocation in a cache. The number of bytes in a block is varied according to design choice, and may be of any size. In addition, each of the terms "cache tag", "cache line tag", and "cache block tag" is interchangeable. In various embodiments, the cache memory subsystems are implemented as a hierarchy of caches.

As used herein, the term "access" refers to performing a memory read request or a memory write request operation that results in a cache hit if the requested data of a corresponding request address resides in the cache. Alternatively, the memory access request results in a cache miss if the requested data does not reside in the cache. As used herein, "memory read requests" are also referred to as read requests, and similarly, "memory write requests" are also referred to as write requests.

If requested data is not found in the cache memory subsystem in computing resources 110, then a memory access request is generated and transmitted to the memory controller 130. As shown, memory controller 130 includes request queues 132 for queuing memory access requests received from computing resources 110 via communication fabric 120. Memory controller 130 also has a response queue 134 for storing responses received from DRAM 170. In an embodiment, request queues 132 include one or more queues for storing memory access requests. In another embodiment, request queues 132 include a read queue for storing memory read requests and a separate write queue for storing memory write requests. In other embodiments, request queues 132 include a unified queue for storing both memory read requests and memory write requests.

In yet other embodiments, request queues 132 include one or more queues for storing received memory access requests and a separate queue for storing scheduled memory access requests selected from the one or more queues. Schedulers 136 include one or more scheduling blocks for selecting memory access requests stored in request queues 132 for out-of-order issue to DRAM 170. Therefore, memory controller 130 supports out-of-order issue of the memory access requests to DRAM 170 based on priorities and target addresses.

In various embodiments, memory bus 150 supports sending data traffic in a single direction for a given amount of time, such as during a given mode of the read mode and the write mode, and then sends data traffic in the opposite direction for another given amount of time such as during the other mode of the read mode and the write mode. In an embodiment, memory bus 150 utilizes at least a command bus and a data bus, and memory bus 150 supports a read mode for sending data traffic on the data bus from DRAM 170 to memory controller 130. Additionally, memory bus 150 supports a write mode for sending data traffic on the data bus from memory controller 130 to DRAM 170.

In some embodiments, memory controller 130 also supports out-of-order issue of the responses to computing resources 110 based on at least priorities. In various embodiments, schedulers 136 in memory controller 130 schedule the issue of the stored memory access requests based on a quality-of-service (QoS) or other priority information, age, a process or thread identifier (ID), and a relationship with other stored requests such as targeting a same memory channel, targeting a same rank, targeting a same bank and/or targeting a same page.

In various embodiments, the cache controller and memory device controller logic 138, which is also referred to as logic 138, divides a received single memory access request into two separate memory access requests. In an embodiment, logic 138 generates a tag access request based on the received memory access request, and generates a data access request different from the tag access request based on the received memory access request. The tag access request and the data access request can also be referred to as a cache tag access request and a cache data access request. In some embodiments, each of a read queue and a write queue within request queues 132 is divided into a tag queue and a separate data queue. In one embodiment, logic 138 generates a unique identifier from one or more of an identifier generated from a free list, a thread or process identifier, a computing source identifier, a target address, an age or timestamp, and so forth. In some embodiments, logic 138 stores the generated unique identifier in each of the tag access request and the data access request.

In some embodiments, logic 138 schedules sending the data access request based on information generated by processing the tag access request. In various embodiments, the logic 138 prevents sending the data access request until information generated by processing the tag access request is available. Therefore, the tag access request is sent to a memory device before the data access request is sent, if the data access request is sent at all. In an embodiment, a page index within the target address is used to identify a given row of multiple rows in a targeted one of the banks 174A-174B. In an embodiment, the given row stores one or more tags within a portion of the given row. Since DRAM 170 is used as a last-level cache, such as a RAM cache memory, the memory device can be referred to as a RAM cache memory device.

In various embodiments, logic 138 performs a partial tag comparison between the one or more tags stored in the given row and a tag in the target address of the single memory access request, which is stored in the tag access request. In various embodiments, the partial tag comparison has an appreciably smaller latency than a full tag comparison. If no matches are detected, then a tag miss occurred, and logic 138 cancels sending the data access request to DRAM 170. The memory controller invalidates, or otherwise deallocates, a queue entry storing the data access request. Therefore, it is known the requested data is not in the system memory sooner such as being known after the appreciably smaller latency of the partial tag comparison in contrast to being known after the appreciably larger latency of the full tag comparison. For a tag miss, logic 138 also sends the single memory access request to a main memory 162. In some embodiments, the full tag comparison begins at the same time as the partial tag comparison. When no matches are detected for the partial tag comparison, either the full tag comparison is gated or stopped, or the full tag comparison is permitted to continue, but the results are discarded.

In an embodiment, when logic 138 determines one or more tag hits occur based on the partial tag comparison, logic 138 compares an entirety of the one or more tags in the given row with an entirety of the tag in the target address of the tag access request. As described earlier, in some embodiments the full tag comparison begins at the same time as the partial tag comparison. In various embodiments, this full tag comparison has an appreciably larger latency than a partial tag comparison. If the full tag comparison results in a tag miss, then logic 138 performs the above steps used for a tag miss determined from a partial tag comparison. If the full tag comparison results in a tag hit, then logic 138 sends the data access request to DRAM 170. In an embodiment, the full tag hit result is used to identify a particular portion of a row read out later by the processing of the data access request. For example, a particular cache line in the row is identified by the tag hit result.

The off-chip disk memory 162 may provide a non-volatile, random access secondary storage of data. In one embodiment, the off-chip disk memory 162 may include one or more hard disk drives (HDDs). The HDDs typically include one or more rotating disks, each coated with a magnetic medium. These disks rotate at a rate of several thousand rotations per minute. A magnetic actuator is responsible for positioning magnetic read/write devices over the rotating disks. In another embodiment, the off-chip disk memory 162 utilizes a Solid-State Disk (SSD). A Solid-State Disk may also be referred to as a Solid-State Drive. An SSD may emulate a HDD interface, but an SSD utilizes solid-state memory to store persistent data rather than electromechanical devices as found in a HDD. For example, an SSD may include banks of Flash memory.

Figure 2:
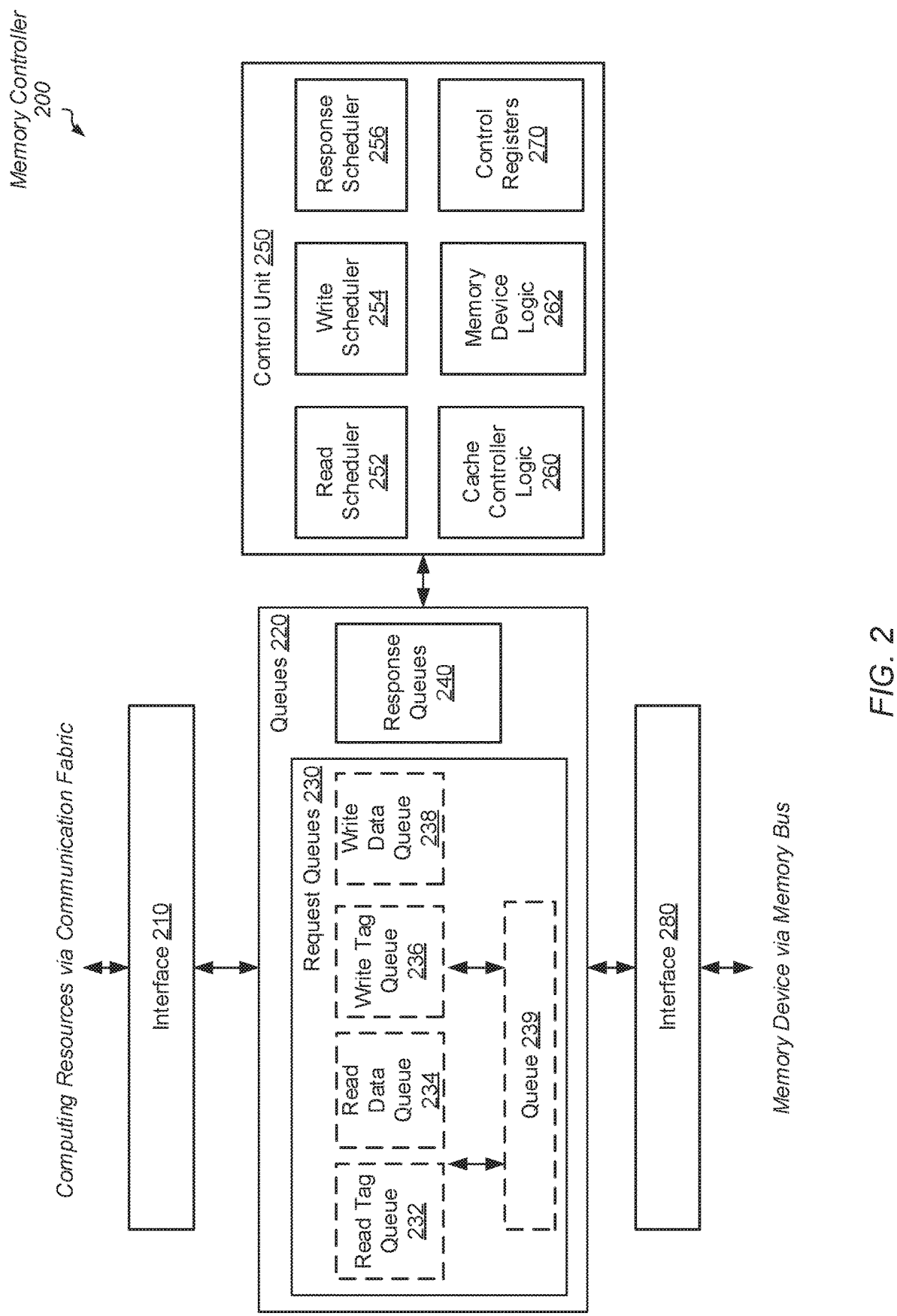
FIG. 2 is a block diagram of one embodiment of a memory controller.

Referring to FIG. 2, a generalized block diagram of one embodiment of a memory controller 200 is shown. In the illustrated embodiment, memory controller 200 includes an interface 210 to computing resources via a communication fabric, queues 220 for storing received memory access requests and received responses, control unit 250 and an interface 280 to a memory device via at least a data bus of a memory bus. Each of interfaces 210 and 280 supports respective communication protocols.

In an embodiment, queues 220 includes a read tag queue 232 and a read data queue 234 for storing generated requests based on received read requests. In addition, queues 220 includes write tag queue 236 and write data queue 238 for storing generated requests based on received write requests. In one embodiment, queues 220 include queue 239 for storing scheduled memory access requests selected from one or more of queues 232-238 or a unified queue if one is used.

In some embodiments, read scheduler 252 includes arbitration logic for selecting read tag requests from the read tag queue 232 out-of-order. Read scheduler 252 schedules the out-of-order issue of the stored tag read requests within the read tag queue 232 to the memory device based on a quality-of-service (QoS) or other priority information, age, a process or thread identifier (ID), and a relationship with other stored requests such as targeting a same memory channel, targeting a same rank, targeting a same bank and/or targeting a same page. Write scheduler 254 includes similar selection logic for the write tag queue 236. In an embodiment, response scheduler 256 includes similar logic for issuing, based on priorities, responses out-of-order to the computing resources, which were received from the memory device. In various embodiments, the response queues 240 store the response data to be sent to the computing resources.

In some embodiments, control registers 270 store an indication of a current mode. For example, the off-chip memory data bus and memory device support either a read mode or a write mode at a given time. Therefore, traffic is routed in a given single direction during the current mode and changes direction when the current mode is changed after a data bus turnaround latency. In various embodiments, control registers 270 store a threshold number of read requests (read burst length) to send during the read mode.

In an embodiment, cache controller logic 260 divides a received single memory access request into two separate memory access requests. In an embodiment, logic 260 generates a tag access request based on the received memory access request, and generates a data access request different from the tag access request based on the received memory access request. In some embodiments, the logic 260 stores an indication, which specifies each of the tag access request and the data access request is generated from a same received memory access request. In an embodiment, the indication is stored within each of the tag access request and the data access request. In one embodiment, the indication is a unique identifier generated from one or more of an identifier generated from a free list, a thread or process identifier, a computing source identifier, a target address, an age or timestamp, and so forth. In other embodiments, logic 260 stores the indication in corresponding queue entries, such as an entry in read tag queue 232, which stores contents of the read tag request, and an entry in read data queue 234, which stores contents of the separate, but corresponding, read data request. The write tag queue 236 and the write data queue 238 store similar indications for write requests.

In various embodiments, memory device logic 262 prevents sending the data access request until information generated by processing the tag access request is available. Therefore, the tag access request is sent to a memory device before the data access request, if the data access request is sent at all. In an embodiment, a page index within the target address is used by logic 262 to identify a given row of multiple rows in a targeted bank of the memory device. In an embodiment, the given row stores one or more tags within a portion of the given row.

In various embodiments, logic 262 performs a partial tag comparison between the one or more tags stored in the given row and a tag in the target address of the single memory access request, which is stored in the tag access request. If no matches are detected, then a tag miss occurred, and logic 262 cancels sending the data access request to the memory device. Logic 262 invalidates, or otherwise deallocates, a queue entry in either read data queue 234 or write data queue 238 based on the access type. For a tag miss, logic 262 also sends the single memory access request to a separate system memory or main memory. In some embodiments, logic 262 begins performing the full tag comparison at the same time as performing the partial tag comparison. When no matches are detected for the partial tag comparison, either the full tag comparison is gated or stopped, or the full tag comparison is permitted to continue, but the results are discarded.

In an embodiment, when logic 262 determines one or more tag hits occur based on the partial tag comparison, logic 262 compares an entirety of the one or more tags in the given row with an entirety of the tag in the target address of the tag access request. If the full tag comparison results in a tag miss, then logic 262 performs the above steps used for a tag miss determined from a partial tag comparison. If the full tag comparison results in a tag hit, then logic 262 sends the data access request to DRAM 170.

Figure 3:
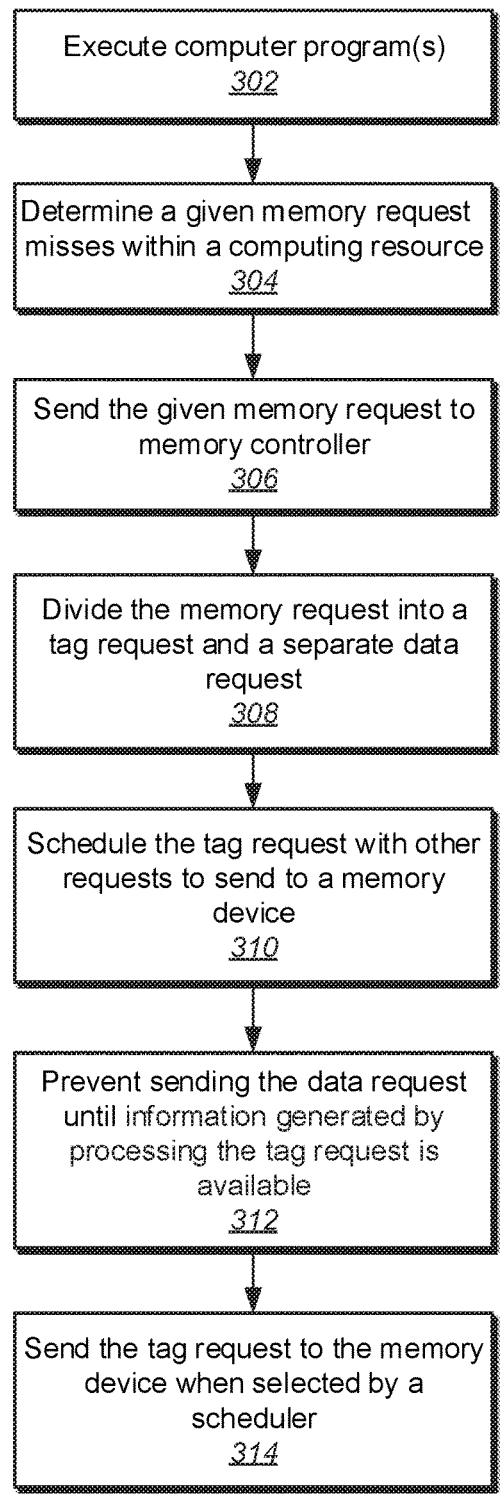
FIG. 3 is a flow diagram of one embodiment of a method for sending a memory access request to system memory.

Referring now to FIG. 3, one embodiment of a method 300 for sending a memory access request to a last-level cache storage arrangement in DRAM is shown. For purposes of discussion, the steps in this embodiment (as well as in FIGS. 4-5) are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 300.

One or more computing resources execute computer programs, or software applications. Examples of a computing resource are given earlier. The computing resource determines a given memory access request misses within a cache memory subsystem within the computing resource. The computing resource sends the memory access request to system memory such as DRAM via a memory controller.

During execution of a computer program (block 302), a memory request that misses within a computing resource is detected (block 304). The given memory request is sent to a memory controller coupled to at least one memory device (block 306) where it is divided into a tag request and a separate data request (block 308). The tag request is scheduled with other tag requests to send to a memory device (block 310). The data request is prevented from being sent until information generated by processing the tag request is available (block 312). The tag request is sent to the memory device when selected by a scheduler (block 314). In some cases the tag request is the only tag request since the given memory request is the only memory request. In such a case, scheduling does not use information from multiple tag requests. In some embodiments, when only a single tag request and a single data request are present, the data request is speculatively sent along with the tag request if the memory request is a read request. The retrieved data can be discarded if a full tag miss ultimately occurs. Otherwise, a partial tag comparison is performed prior to sending the data request as further described in the upcoming descriptions for method 400 and method 500.

Figure 4:
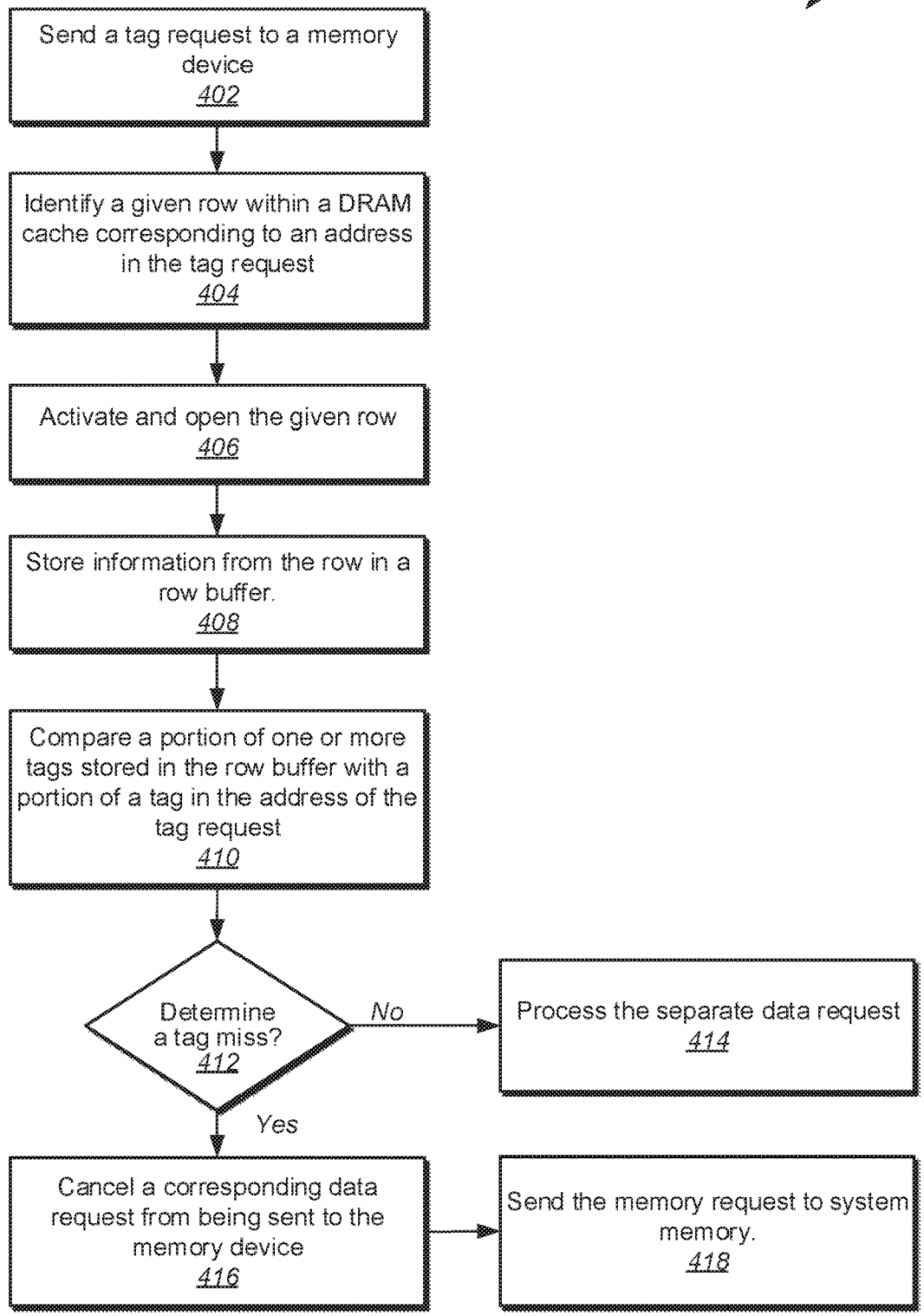
FIG. 4 is a flow diagram of one embodiment of a method for processing a tag access request for a cache storage arrangement in system memory.

Referring to FIG. 4, another embodiment of a method 400 for processing a tag access request for a last-level cache storage arrangement in DRAM is shown. In the example shown, a tag request is sent to a memory device (block 402). As described earlier, in various embodiments logic for the cache controller (e.g., logic 260 of FIG. 2) generates a tag request and a separate data request from a single received memory request. The cache controller logic then sends the tag request to the logic for the memory controller, or logic for the memory device (i.e., logic 262 of FIG. 2). The logic for the memory device within the memory controller sends the tag request to the memory device. Responsive to the tag request, a given row is identified within a DRAM cache corresponding to an address in the tag request (block 404). The given row is opened by an activation transaction (block 406). Information from the row is stored in a row buffer (block 408). A portion of one or more tags stored in the row buffer is compared with a portion of a tag (partial tag compare) in the address of the tag request (block 410).

If a tag miss based on the partial tag comparison does not occur ("no" branch of the conditional block 412), then a partial tag hit has occurred and the separate data request is processed (block 414). In one embodiment, the separate data request is a read request and the data request is speculatively processed by being sent to the memory device. In some embodiments, a full tag comparison is also performed. In some embodiments, the logic for the memory device performs the partial tag comparison and logic for the cache controller performs the full tag comparison. If the data request is a write request, then no processing for the data request occurs until a full tag comparison is performed. An entirety of the one or more tags stored in the row buffer is compared with the entirety of the tag in the target address of the tag request. In various embodiments, the latency for the full tag comparison is greater than the latency for the partial tag comparison. If a full tag miss is determined based on the full tag comparison, then the data retrieved by sending a read request is discarded. If the data request is a read request and it was already sent to the memory device, then the retrieved data is discarded and the logic for the cache controller sends the corresponding memory request to system memory. If the data request was not already sent, then the logic for the cache controller cancels the data request and sends the corresponding memory request to system memory. If a full tag hit is determined based on the full tag comparison, then the data retrieved by sending the data request (read request) is sent to the logic for the cache controller to service the corresponding memory request. If a full tag hit occurs and the data request is a write request, then the data request is sent to the memory device to service the memory request. Otherwise, if it is determined a tag miss occurred based on the partial tag comparison ("yes" branch of the conditional block 412), then a corresponding data request is cancelled from being sent to the memory device (block 416) and the memory request is sent to system memory (block 418) to provide fill data in the DRAM cache. In various embodiments, the above communication between the logic of the memory controller and the logic of the cache controller is used as well as the above steps are used for discarding data, canceling a data request or servicing requests. In some embodiments, the logic for the memory device (i.e., logic 262 of FIG. 2) sends an indication of the partial tag miss to logic for the cache controller (i.e., logic 260 of FIG. 2), which discards speculatively retrieved data or cancels the data request. In other embodiments, the logic for the memory device discards the speculatively retrieved data and sends the indication of the partial tag miss to the logic for the cache controller.

Figure 5:
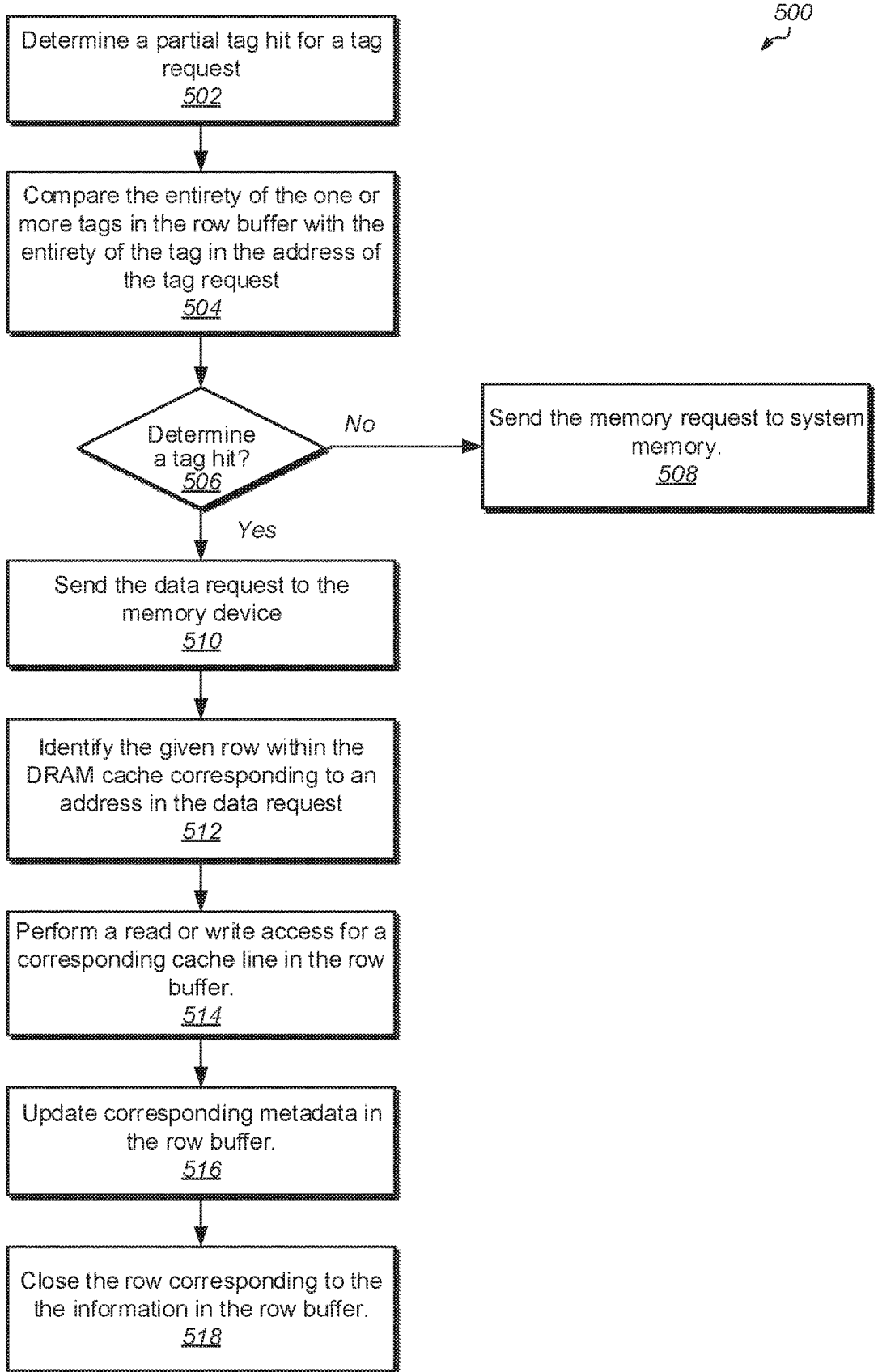
FIG. 5 is a flow diagram of another embodiment of a method for processing a data access request separate from a tag access request for a cache storage arrangement in system memory.

Referring to FIG. 5, another embodiment of a method 500 for processing a data access request separate from a tag access request for a last-level cache storage arrangement in DRAM is shown. A partial tag hit is determined for a tag request (block 502). Afterward, the entirety of the one or more tags in the row buffer is compared with the entirety of the tag in the address of the tag request (block 504). If it is determined a full tag miss occurs ("no" branch of the conditional block 506), then the memory request is sent to system memory to provide fill data in the DRAM cache (block 508). As described earlier, in various embodiments, if the data request is a read request and it was speculatively sent to the memory device, then the retrieved data is discarded and the logic for the cache controller sends the corresponding memory request to system memory. If the data request has not yet been sent, then the logic for the cache controller cancels the data request and sends the corresponding memory request to system memory.

If it is determined a full tag hit occurs ("yes" branch of the conditional block 506), then the data request is sent to the memory device (block 510) and the given row within the DRAM cache corresponding to an address in the data request is identified (block 512). A read or write access for a corresponding cache line in the row buffer is performed based on the access type (block 514), corresponding metadata is updated in the row buffer (block 516), and the row corresponding to the information in the row buffer is closed (block 518). As described earlier, in some embodiments, when the data request is a read request, the data request is speculatively sent to the memory device based on the partial tag comparison prior to the completion of the full tag comparison. In such cases, the retrieved data is discarded if the full tag comparison determines a full tag miss. If the full tag comparison determines a full tag hit, then the retrieved data is provided sooner for servicing the read request.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A random access memory (RAM) cache memory controller, comprising:
   a first interface for receiving memory access requests;
   a second interface for sending cache access requests to a RAM cache memory device; and
   control logic;
   wherein in response to receiving a memory access request, the control logic is configured to:

generate a cache tag access request based on the memory access request;

generate a cache data access request different from the cache tag access request based on the memory access request prior to sending the cache tag access request;

store a unique identifier in each of the cache tag access request and the cache data access request, wherein the unique identifier specifies each of the cache tag access request and the cache data access request is generated from a same memory access request;

send the cache tag access request to the RAM cache memory device via the second interface; and schedule sending the cache data access request to the RAM cache memory device based on information generated by processing the cache tag access request.

2. The RAM cache memory controller as recited in claim 1, wherein the control logic is configured to:

identify a given row of a plurality of rows within the RAM cache memory device corresponding to an address in the cache tag access request; and compare only a portion of one or more tags stored in the given row with only a portion of a tag in the address of the cache tag access request.

3. The RAM cache memory controller as recited in claim 2, wherein scheduling sending the cache data access request comprises canceling sending the cache data access request to the RAM cache memory device responsive to determining a tag miss based on comparing only the portion of the tag in the address.

4. The RAM cache memory controller as recited in claim 2, wherein in response to determining a tag miss based on comparing only the portion of the tag in the address, the control logic is further configured to send the memory access request to one or more of a system memory and a main memory.

5. The RAM cache memory controller as recited in claim 2, wherein scheduling sending the cache data access request comprises sending the cache data access request to the RAM cache memory device via the second interface responsive to determining a tag hit based on comparing an entirety of the one or more tags in the given row with an entirety of the tag in the address of the cache tag access request.

6. The RAM cache memory controller as recited in claim 5, wherein the control logic is further configured to identify data in a given row accessed by the cache data access request based on a position of a tag corresponding to the tag hit resulting from an access by the cache tag access request.

7. A method, comprising:

generating, by a processor, memory access requests for data stored in a memory device;

receiving, by a memory controller, the memory access requests from the processor; and in response to receiving a memory access request:

generating, by the memory controller, a tag access request based on the memory access request;

generating, by the memory controller, a data access request different from the tag access request based on the memory access request prior to sending the tag access request;

storing, by the memory controller, a unique identifier in each of the tag access request and the data access request, wherein the unique identifier specifies each of the tag access request and the data access request is generated from a same memory access request;

sending, by the memory controller, the tag access request to the memory device; and scheduling, by the memory controller, sending the data access request to the memory device based on information generated by processing the tag access request.

8. The method as recited in claim 7, further comprising:

identifying a given row of a plurality of rows within the memory device corresponding to an address in the tag access request; and comparing only a portion of one or more tags stored in the given row with only a portion of a tag in the address of the tag access request.

9. The method as recited in claim 8, wherein scheduling sending the data access request comprises canceling sending the data access request to the memory device responsive to determining a tag miss based on comparing only the portion of the tag in the address.

10. The method as recited in claim 8, wherein in response to determining a tag miss based on comparing only the portion of the tag in the address, the method further comprises sending the memory access request to one or more of a system memory and a main memory.

11. The method as recited in claim 8, wherein scheduling sending the data access request comprises sending the data access request to the memory device responsive to determining a tag hit based on comparing an entirety of the one or more tags in the given row with an entirety of the tag in the address of the cache tag access request.

12. The method as recited in claim 11, further comprising identifying data in a given row accessed by the cache data access request based on a position of a tag corresponding to the tag hit resulting from an access by the cache tag access request.

13. A computing system, comprising:

a processor configured to generate memory access requests for data stored in a memory device; and a memory controller coupled to the memory device;

wherein in response to receiving a memory access request, the memory controller is configured to:

generate a tag access request based on the memory access request;

generate a data access request different from the tag access request based on the memory access request prior to sending the tag access request;

store a unique identifier in each of the tag access request and the data access request, wherein the unique identifier specifies each of the tag access request and the data access request is generated from a same memory access request;

send the tag access request to the memory device;

schedule sending the data access request to the memory device based on information generated by processing the tag access request.

14. The computing system as recited in claim 13, wherein the memory controller is configured to:

identify a given row of a plurality of rows within the memory device corresponding to an address in the tag access request; and compare only a portion of one or more tags stored in the given row with only a portion of a tag in the address of the tag access request.

15. The computing system as recited in claim 14, wherein scheduling sending the cache data access request comprises canceling sending the cache data access request to the memory device responsive to determining a tag miss based on comparing only the portion of the tag in the address.

16. The computing system as recited in claim 14, wherein in response to determining a tag miss based on comparing only the portion of the tag in the address, the memory controller is further configured to send the memory access request to one or more of a system memory and a main memory.

17. The computing system as recited in claim 15, wherein scheduling sending the cache data access request comprises sending the cache data access request to the memory device responsive to determining a tag hit based on comparing an entirety of the one or more tags in the given row with an entirety of the tag in the address of the cache tag access request.

* * * * *